J. V. MITCHELL.
WEIGHT REGISTERING AND RECORDING MECHANISM FOR REFRIGERATORS.
APPLICATION FILED MAR. 21, 1910.
988,126.
Patented Mar. 28, 1911.
4 SHEETS—SHEET 1.
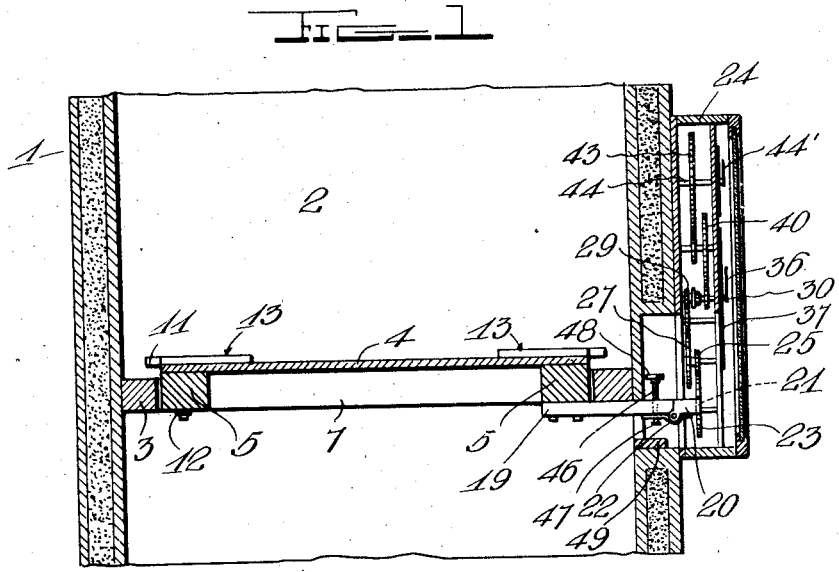
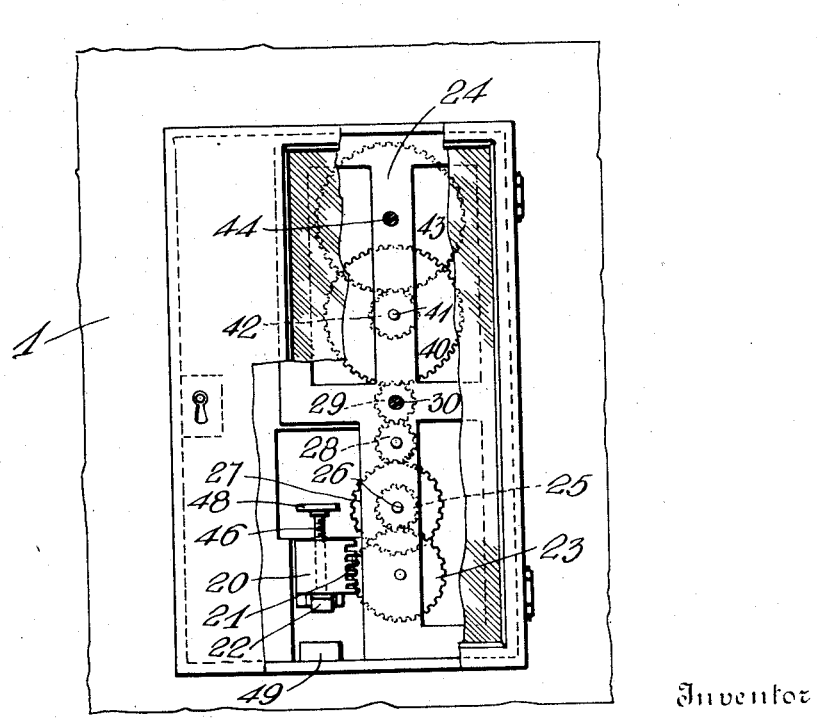
Witnesses
Inventor
J. V. Mitchell
by H. B. Wilson &co
Attorneys

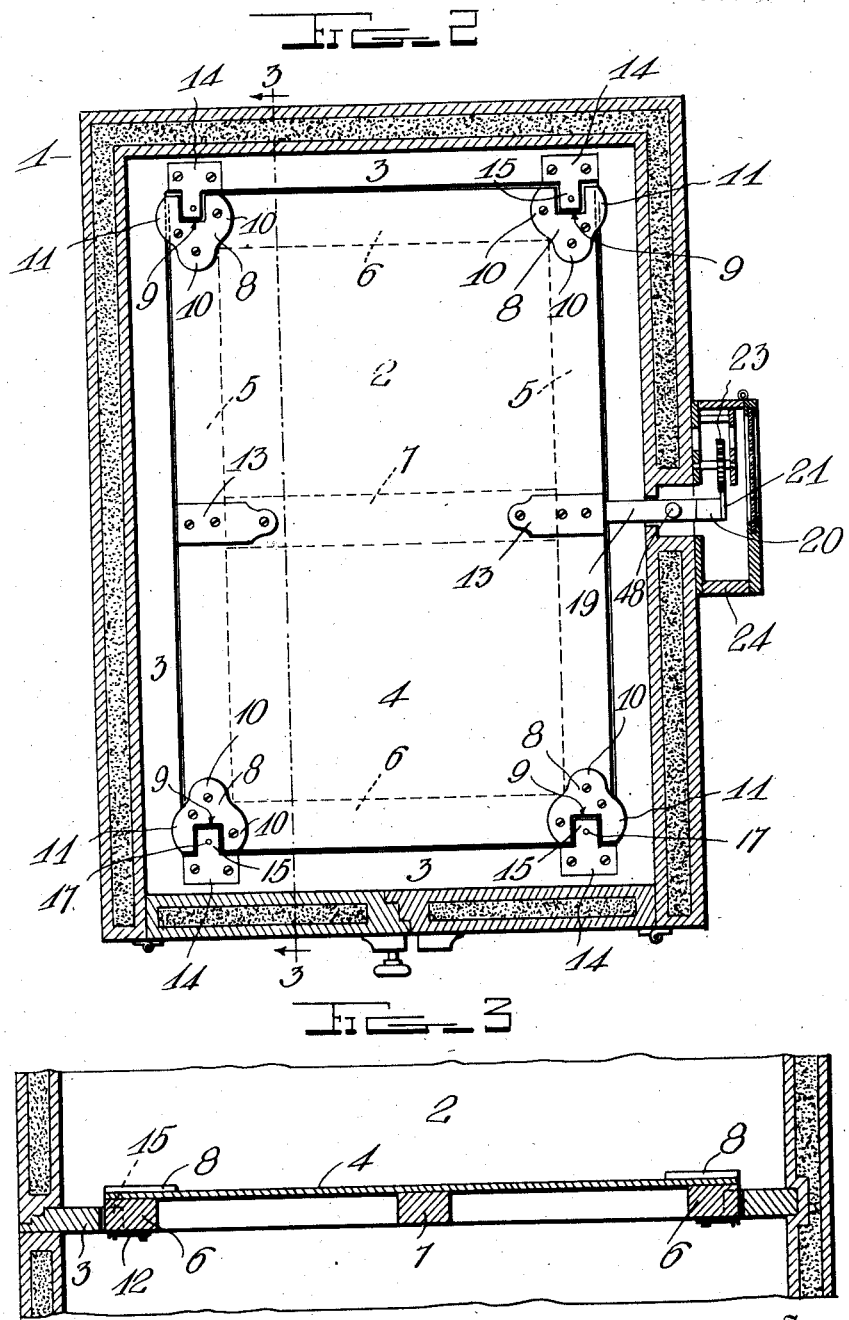

J. V. MITCHELL.
WEIGHT REGISTERING AND RECORDING MECHANISM FOR REFRIGERATORS.
APPLICATION FILED MAR. 21, 1910.
988,126.
Patented Mar. 28, 1911.
4 SHEETS—SHEET 3.
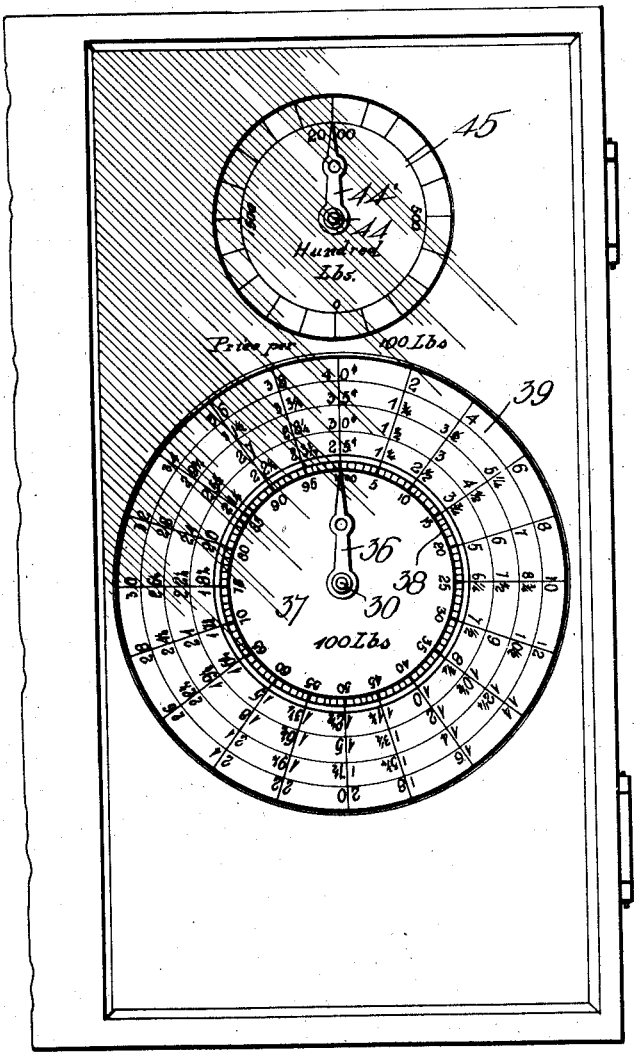
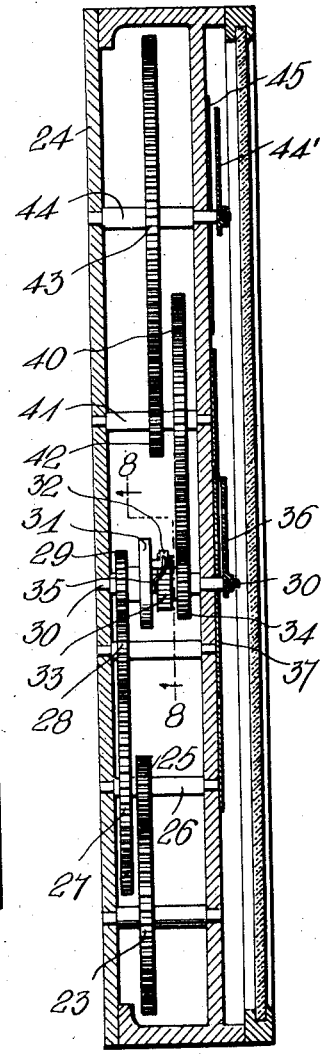
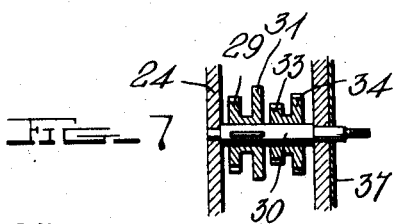
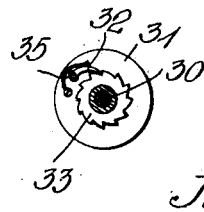
Witnesses
C. H. Griesbauer.
Inventor
J. V. Mitchell
by H. R. Wilson & Co.
Attorneys

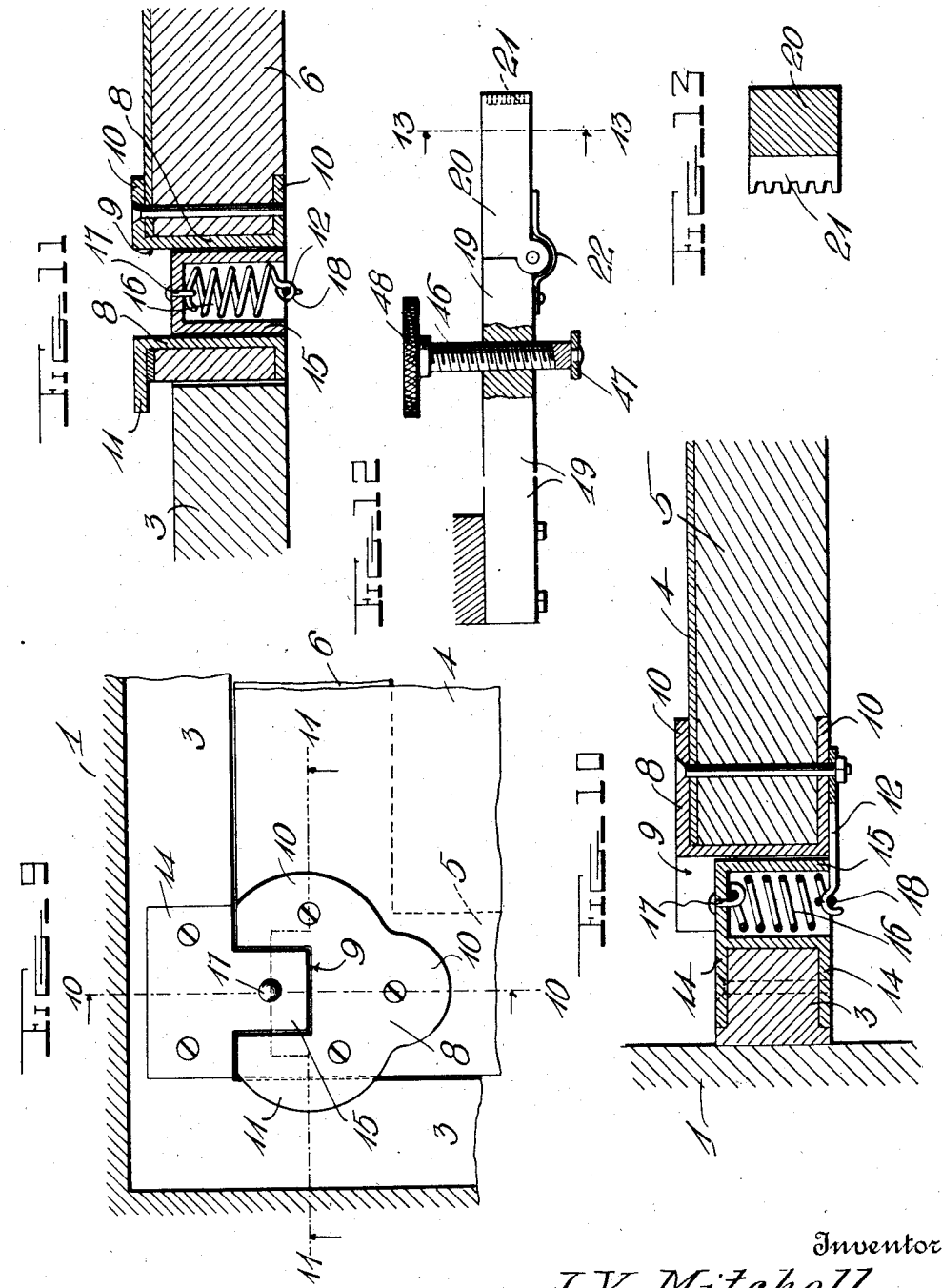

ated and the total weight of the successive pieces placed therein during certain periods will be recorded.
UNITED STATES PATENT OFFICE.

JAMES V. MITCHELL, OF MARTINSVILLE, INDIANA.

WEIGHT REGISTERING AND RECORDING MECHANISM FOR REFRIGERATORS.

988,126.

Specification of Letters Patent.  Patented Mar. 28, 1911.

Application filed March 21, 1910. Serial No. 550,666.

*To all whom it may concern:*

Be it known that I, JAMES V. MITCHELL, a citizen of the United States, residing at Martinsville, in the county of Morgan and State of Indiana, have invented certain new and useful Improvements in Weight Registering and Recording Mechanism for Refrigerators; and I do declare the following to be a full, clear, and exact description of the invention, such as will enable others skilled in the art to which it appertains to make and use the same.

This invention relates to improvements in weight registering and recording mechanisms for refrigerators or ice boxes.

One object of the invention is to provide a mechanism of this character whereby the weight of a piece of ice placed in the ice compartment of a refrigerator will be indicated and the total weight of the successive pieces placed therein during certain periods will be recorded.

Another object is to provide means for locking the mechanism against operation.

With the foregoing and other objects in view, the invention consists of certain novel features of construction, combination and arrangement of parts as will be more fully described and particularly pointed out in the appended claims.

In the accompanying drawings, Figure 1 is a vertical section through the upper portion of a refrigerator showing the application of the invention; Fig. 2 is an enlarged horizontal section of the same; Fig. 3 is a vertical section taken at right angles to Fig. 1 on the line 3—3 of Fig. 2; Fig. 4 is an enlarged front view of the casing containing the registering and recording mechanism, parts being broken away; Fig. 5 is an enlarged view of the glazed portion of the door of the casing showing the dials of the recording mechanism; Fig. 6 is a central vertical section of the recording mechanism; Fig. 7 is a detail sectional view taken on a line with the shaft of the price computing dial, showing the arrangement of the tight and loose gears thereon; Fig. 8 is a detail sectional view on the line 8—8 of Fig. 6, showing the pawl and ratchet connection between the tight and loose gears shown in Fig. 7; Fig. 9 is an enlarged sectional view of one corner of the refrigerator showing a plan view of one corner of the platform and the stationary frame of the scale; Fig. 10 is a vertical sectional view of the same, parts taken on the line 10—10 of Fig. 9; Fig. 11 is a similar view taken at right angles to Fig. 10 on the line 11—11 of Fig. 9; Fig. 12 is an enlarged detail side view, partly in section, of the scale beam showing the stop bolt for locking the platform against movement; Fig. 13 is a cross sectional view of the beam on the line 13—13 of Fig. 12.

Referring more particularly to the drawing 1 denotes a refrigerator or ice box in which is arranged an ice compartment 2. In the bottom of the ice compartment around the sides of the same are arranged inwardly projecting cleats 3 which form an open stationary frame within which is loosely mounted the scale platform 4 which forms the bottom of the ice compartment. The platform 4 comprises a frame of suitable shape consisting of side bars 5, end cross bars 6 and an intermediate or central cross bar 7. The bars 5, 6 and 7 are covered with sheet metal or other suitable material to form the bottom of the compartment.

Formed integral with or secured to the opposite ends of the side bars 5 in any suitable manner are guide castings 8, in the outer portions of which are formed guide passages 9. The castings 8 are here shown as being provided on their inner sides and ends with parallel ears or lugs 10 which embrace or fit over the adjacent ends of the side and end bars of the platform, said ears being bolted or otherwise secured to the bars as shown. The castings thus form corner fastenings for the platform frame whereby the latter is rigidly secured together.

On the outer sides of the upper surfaces of the castings 8 are formed laterally projecting stop flanges 11 which are adapted to project over and to be brought into engagement with the side cleats of the stationary platform supporting frame 3 when the platform is depressed by the weight of the ice placed in the compartment. Secured to the rear wall of the passages 9 in the castings 8 at the lower side thereof are outwardly projecting centrally disposed hooks, 12, the purpose of which will be hereinafter described. The intermediate bar 7 of the supporting frame is secured to the side bars 5 by suitable clips or fastening plates 13.

Secured to the end cleats 3 of the stationary platform supporting frame are platform supporting castings 14, said castings having formed thereon boxes 15 closed on all sides except the bottom. The castings 14 are of channel iron construction and embrace the cleats 3 to which they are bolted or otherwise rigidly secured. In the boxes 15 are arranged stiff coiled platform supporting springs 16, the upper ends of which are secured to hook bolts 17 arranged in the top of the boxes or castings. On the lower ends of the springs are formed eyes 18 which are adapted to be engaged by the hooks 12 of the castings 8 on the scale platform. The boxes 15 project into the passages 9 in the castings 8 and the latter have a loose sliding engagement with the boxes when the hooks 12 are connected with the springs 16 as described. It will thus be seen that the platform 4 is yieldingly supported by the springs 16 in the boxes and castings secured to the stationary frame of the ice compartment so that when a piece of ice or other weight is applied to the platform 4, the latter will be depressed against the tension of the springs until the flanges 11 on the castings 8 come into engagement with the upper sides of the cleats 3, at which time the further downward movement of the platform is stopped.

From the construction shown in the drawings, it will be seen that the castings 8 and passages 9 are of greater width than the thickness of the boxes on the castings 14 and that when there is no weight on the platform 4, the springs 16 will hold the latter above the cleats or stationary frame 3 a suitable distance, which is preferably about one-half inch. Thus it will be understood that the platform has a downward movement of one-half inch before the same is stopped by the engagement of the flanges 11 with the cleats 3.

My improved weighing or weight indicating mechanism comprises a scale beam 19 which is secured at its inner end to the lower side of the platform 4 in any suitable manner and has its outer end preferably formed in two sections, the outer and shorter section 20 of which is hingedly connected to the outer end of the inner section by a knuckle joint. To the outer end of the shorter section 20 of the beam is secured a rack bar 21, the purpose of which will be hereinafter described. Secured to the lower side of the main or inner portion of the beam is a flat spring 22, the outer end of which bears against the under side of the short outer section 20, so that said sections are normally in alinement.

The rack bar 21 is operatively engaged with a spur gear 23 forming part of a weight indicating and recording mechanism which is arranged in a suitable casing 24, secured to or in one side of the refrigerator or arranged in any other suitable manner, and having on its outer side a door provided with a transparent panel whereby the dials of the mechanism may be easily observed. The gear 23 is in operative engagement with a pinion 25 fixedly mounted on a shaft 26 on which is also fixedly mounted a spur gear 27. The gear 27 is engaged with a pinion 28 which in turn engages and operates a pinion 29 fixedly mounted on a shaft 30 mounted in the gear supporting frame of the casing 24. Fixed to or forming part of the pinion 29 is a radially projecting flange 31 on which is pivotally mounted a pawl 32 adapted to engage a ratchet gear 33 forming part of or being integrally secured to a spur gear pinion 34. The pawl 32 is held in operative engagement with the ratchet gear 33 by a suitable spring 35. The outer end of the shaft 30 projects beyond the outer side of the gear supporting frame in the casing 24 and the projecting end of the shaft is preferably threaded and has screwed thereon an indicating finger 36, which is adapted to point to the scales on a weight indicating and price computing dial 37 arranged on the outer face of the gear supporting frame as shown.

On the dial 37 is arranged a scale 38 indicating one hundred pounds while around the weight scale is arranged a price computing scale 39, whereby the prices of various quantities of ice from five pounds up to one hundred pounds at certain given prices per hundred may be readily ascertained, this scale being here shown as giving the cost of the quantity of ice when the price is twenty-five, thirty, thirty-five or forty cents per one hundred pounds. It will be obvious, however, that the scales may be arranged to give the cost at any price per hundred pounds.

As hereinbefore stated, the pinion 29 is fixedly mounted on the shaft 30 and turns the same in one direction or the other when weight is applied to and removed from the platform 4. The ratchet gear 33 and pinion 34 are loose on the shaft 30 and are only turned in one direction by the engagement of the pawl 32 with the ratchet teeth when the pinion 29 is turned to move the finger 36 in a forward direction. When the pinion moves in a reverse direction the pawl 32 will play loosely over the teeth of the ratchet gear and will not reverse the movement thereof and of the pinion 34. The pinion 34 is in operative engagement with a spur gear 40 fixedly mounted on a shaft 41, which has also fixedly mounted thereon a spur gear pinion 42, which engages a spur gear 43 fixedly mounted on a shaft 44, the end of which projects beyond the outer side of the gear supporting frame and is preferably screw threaded. On the projecting threaded end of the shaft 41 is screwed an indicating finger 44', which is adapted to be moved around a recording dial 45 arranged on the outer side of the gear supporting frame above the dial 37. The dial 45 has a scale indicating two thousand pounds by hundreds.

As hereinbefore described, the pinion 34 which operates the gearing of the recording mechanism is loosely mounted on the shaft 30 and is only operated when said shaft is turned to move the registering finger in a forward direction so that, while the finger 36 of the registering mechanism is permitted to move back when the weight is removed from the platform, the finger 44' of the recording mechanism does not move back but continues to register and record the successive weights placed upon the platform. By this means the total weight of the successive pieces of ice placed upon the platform within a given period may be observed. By providing a screw threaded connection between the pointers and the ends of the shaft to which they are attached, the hands may be moved back manually when desired.

In order to lock the weight registering and recording mechanism against operation, I provide a suitable means for preventing the downward movement of the platform 4 of the ice compartment. The means for holding the platform against movement is here shown and preferably consists of a stop bolt 46 having a screw threaded engagement with the inner portion of the scale beam, said bolt having on its lower end a plate 47 and on its upper end a hand wheel 48. When the bolt is screwed down in operative position, the plate 47 is engaged with a stop plate 49 arranged in a suitable position in the wall of the refrigerator, as shown, thus preventing any downward movement of the platform. As there would be a tendency for the platform and scale beam to tilt or rock to one side, when pressure is applied thereto, if the stop bolt 46 was in an operative position and thereby cause the rack bar 21 to exert undue pressure on the gears of the registering mechanism and injure the latter, I provide means for overcoming this danger, said means consisting of hinging the outer portion 20 of the scale beam to the inner portion as hereinbefore described by means of a knuckle joint connection, so that, should the platform and inner portion of the beam be tilted or rocked on the bolt 46, the outer end of the inner portion of the scale beam will swing on its hinged connection with the outer end of the beam, thus leaving said outer end in its normal position or, in other words, no tilting movement will be imparted to the outer end 20 of the scale beam bearing the rack bar 21.

While I have herein shown and described my improved registering and recording mechanism applied to a refrigerator for registering the weight of the ice placed therein and for recording the total weight of the successive pieces of ice placed in the refrigerator during a certain period, it is obvious that the apparatus may be used in registering and recording the weight of other commodities.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a weight registering and recording mechanism, a frame, a scale platform, means for yieldably supporting the scale platform, weight registering and recording mechanism, a scale beam to connect the platform with said registering mechanism and frame constructed of hingedly connected sections, a spring to hold said sections in operative position, and a locking mechanism arranged in said scale beam to hold said platform and registering mechanism against operation.

2. In a weight registering and recording mechanism for refrigerators and the like, a stationary frame arranged in the ice compartment of said refrigerator, platform supporting and guiding castings arranged on said frame, a scale platform, guide castings arranged on said platform and adapted to engage the castings on said frame, springs arranged in said frame castings, means to connect the platform castings with said springs whereby the platform is yieldingly supported in operative position above said frame, means to limit the downward movement of the platform when depressed by a weight placed thereon, a scale beam, a registering and recording mechanism operatively connected with said scale beam whereby the weight of the article placed on the platform is indicated and recorded.

3. In a weight registering and recording mechanism for refrigerators and the like, a stationary supporting frame arranged in the ice compartment of the refrigerator, a scale platform arranged in said frame, springs to yieldingly support said platform in operative position, a weight registering and recording mechanism adapted to indicate and record the weight of the articles placed on the platform, a scale beam to connect the platform with said registering mechanism, said scale beam being formed in hingedly connected sections, a spring to hold said sections in operative position, and a locking mechanism arranged in said scale beam whereby said platform and registering mechanism are held against operation.

4. In a weight registering and recording mechanism for refrigerators, a scale platform yieldingly supported in the ice compartment of the refrigerator, a series of weight registering and recording gears, a scale beam to connect said platform with said gears, said beam comprising an inner rigid platform section and an outer gear engaging section, a knuckle joint connection between said sections, a rack bar arranged on said outer section and adapted to engage one of the gears of said registering and recording mechanism, a spring to hold the outer section of the beam in operative position, a stop bolt having a threaded connection with the inner portion of said scale beam, a plate arranged on the lower end of said bolt, a stop plate arranged in the refrigerator wall below said platform whereby when said bolt is screwed downwardly the plate thereon will engage said stop plate and thereby hold said platform and registering mechanism against operation.

In testimony whereof I have hereunto set my hand in presence of two subscribing witnesses.

JAMES V. MITCHELL.

Witnesses:
BENJAMIN W. TILFORD,
CHARLES J. MITCHELL.